United States Patent [19]

Viles

[11] 4,449,445
[45] May 22, 1984

[54] RECIRCULATING ROLLER BEARING ROCKER CAM SUPPORT

[75] Inventor: Alan H. Viles, Columbus, Ohio

[73] Assignee: Abex Corporation, Stamford, Conn.

[21] Appl. No.: 383,678

[22] Filed: Jun. 1, 1982

[51] Int. Cl.³ .......................... F01B 13/04; F04B 1/30
[52] U.S. Cl. ........................................ 92/12.2; 91/505
[58] Field of Search ............................... 417/218, 222; 91/504–506; 92/12.2

[56] References Cited

U.S. PATENT DOCUMENTS

| 3,366,968 | 1/1968 | Iseman | 91/506 |
| 3,465,680 | 9/1969 | Saila | 92/12.2 |
| 3,728,943 | 4/1973 | Lucien | 91/506 |

*Primary Examiner*—William L. Freeh
*Attorney, Agent, or Firm*—Thomas S. Baker, Jr.

[57] ABSTRACT

A variable displacement axial piston pump having a rocker cam and a rocker cradle in which a complement of recirculating rollers is mounted at each side of the rocker cam to support the cam in the cradle and a hold-down plate engages the rollers opposite the bearing surfaces between the rocker cam and cradle.

1 Claim, 3 Drawing Figures

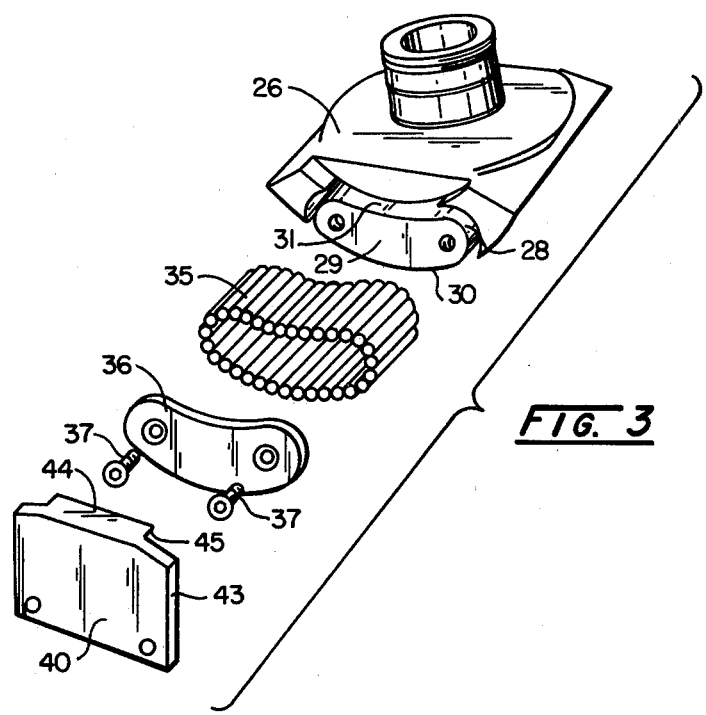

RECIRCULATING ROLLER BEARING ROCKER CAM SUPPORT

BACKGROUND OF THE INVENTION

This invention relates to a variable displacement axial piston pump having a thrust plate mounted on a movable rocker cam which is supported on a rocker cradle. More particularly, this invention relates to a means for supporting the rocker cam on the rocker cradle and for retaining the cam against the cradle.

In some previous axial piston pumps manufactured by the assignee of the instant invention, the rocker cam had a convex, arcuate surface opposite the thrust plate supporting surface which was received in a complementary concave, arcuate surface formed in the rocker cradle. A plain, Teflon-coated, bronze bearing was inserted between the arcuate cam and cradle surfaces to reduce friction therebetween when the cam was pivoted in the cradle. In this machine, pressure fluid was supplied to the bearing to counterbalance the piston forces acting to force the rocker cam against the bearing to reduce the force required to pivot the rocker cam in the cradle. A problem with feeding pressure fluid to the back of the rocker cam is that there is continuous fluid leakage. This leakage results in reduced pump efficiency and a resultant power loss. An additional problem with the plain bearing supported rocker is that the coefficient of friction between the rocker cam and bearing changes with wear. This changing friction level adversely affects a rocker cam drive which has available to it only a limited amount of control pressure.

In the aforementioned pump, the rocker cam was held against the rocker cradle by a pair of bolts, one on each side of the cam, while projected through the pump housing into an arcuate groove in each side of the cam. A disadvantage with this form of rocker cam holddown is that the bolts will bend if an unusually large force tending to lift the rocker cam from the cradle is encountered.

In another type of axial piston pump utilizing a rocker cam and rocker cradle, a ladder-type or caged roller bearing is positioned between the rocker cam and cradle. A disadvantage in using this bearing is that the diameter of the rollers must be relatively large, since the cage reduces the number of rollers which can be inserted between the rocker cam and cradle.

It is desirable to provide a variable displacement axial piston pump having a rocker cam and rocker cradle in which a bearing is interposed between the cam and cradle to reduce friction therebetween and which does not require the use of a hydrostatic balancing force.

It is further desirable to provide a variable displacement axial piston pump having a rocker cam and rocker cradle which utilizes a maximum number of bearing elements between the cam and cradle to provide the maximum load capacity for a given space and permit the use of relatively small bearing elements.

It is also desirable to provide an axial piston pump having a rocker cam and rocker cradle in which a bearing element supports the cam in the cradle and the same element resists forces tending to lift the rocker cam from the rocker cradle.

SUMMARY OF THE INVENTION

The instant invention provides a variable displacement axial piston pump having a rocker cam and rocker cradle in which a complement of recirculating rollers is mounted at each side of the rocker cam to support the cam in the cradle. The recirculating rollers at each side of the rocker cam eliminate the need for a hydrostatic feed to counterbalance the forces acting to push the rocker cam against the cradle, reduce the friction between the rocker cam and cradle to a very low and constant level, and are relatively small and inexpensive. Additionally, a holddown plate is provided which engages the rollers opposite the bearing surface between the rocker cam and cradle, and provides a positive bearing supported holddown for retaining the rocker cam in contact with the cradle.

DESCRIPTION OF THE DRAWINGS

FIG. 3 is an exploded view showing the rocker cam, the roller surface formed on one side of the rocker cam, a roller complement, a side plate and a holddown plate.

DESCRIPTION OF THE PREFERRED EMBODIMENT

Figure 1:
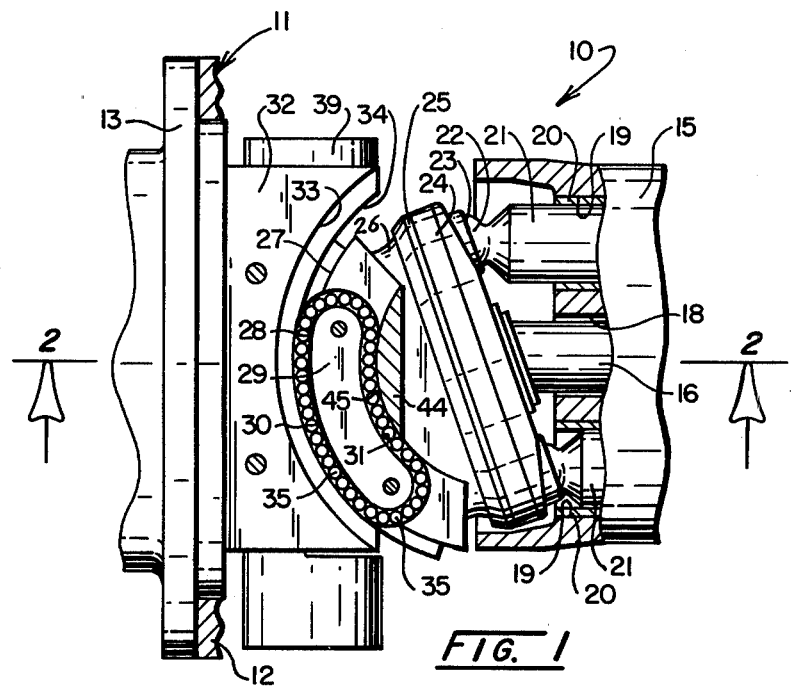
FIG. 1 is a part sectional view taken along line 1—1 of FIG. 2 showing the recirculating roller bearing rocker cam support and holddown of the instant invention.
Figure 2:
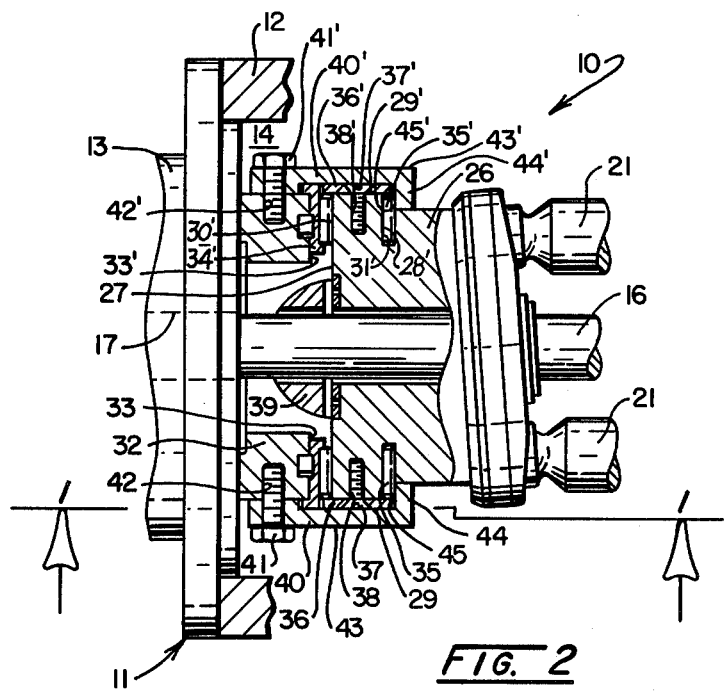
FIG. 2 is an axial part sectional view taken along line 2—2 of FIG. 1 showing the side plates which retain the recirculating roller complements and the holddown plates which engage the rollers and hold the rocker cam against the cradle.

Referring to FIGS. 1 and 2, an axial piston pump 10 has a case 11 which includes a central housing 12, an end cap 13 at one end and a port cap (not shown) at the other end. Case 11 is fastened together by bolts or other known means.

Central housing 12 has a cavity 14 in which a rotatable cylinder barrel 15 is mounted in a bearing (not shown). A splined drive shaft 16 passes through a bore 17 in end cap 13 and engages a splined central bore 18 in barrel 15 to thereby drive pump 10.

Barrel 15 has a plurality of bores 19 equally spaced circumferentially about its rotational axis. A sleeve 20 in each bore 19 receives a piston 21. Each piston 21 has a spherical head 22 which is received in a socket 23 of a shoe 24. Each shoe 24 is retained against a flat thrust plate surface 25 mounted on a movable rocker cam 26 by a shoe retainer assembly. One such assembly is described in U.S. Pat. No. 3,967,541 which is assigned to the assignee of the instant invention.

Rotation of the drive shaft 16 by a prime mover, such as an electric motor (not shown), will rotate barrel 15. If rocker cam 26 and thrust plate 25 are inclined from a neutral or centered (minimum fluid displacement) position, normal to the axis of shaft 16, the pistons will reciprocate as the shoes 24 slide over the surface of thrust plate 25. As the pistons 21 move outward of barrel 15 toward rocker cam 26, as viewed in FIG. 1, low pressure fluid is received in sleeves 20. As the pistons move inward in barrel 15 toward the port plate (not shown) they expel high pressure fluid into an exhaust port. Pump displacement increases as the inclination of thrust plate 25 increases.

Since thrust plate 25 is mounted on rocker cam 26 the angular position of plate 25 is determined by rocker cam 26. The pivotal support of rocker cam 26 will next be described. Rocker cam 26 has a convex, arcuate surface 27 opposite the surface of thrust plate 25. A continuous, kidney-shaped roller surface 28, 28' is formed on each side 29, 29' of rocker cam 26 with arcuate surface 27 therebetween. Roller surfaces 28, 28' each have a convex, arcuate portion 30, 30' and a concave, arcuate portion 31, 31'. The concave, arcuate portions 31, 31' are parallel to the convex, arcuate portions 30, 30'.

A rocker cradle 32 which is rigidly secured to central housing 12 has a pair of concave, arcuate surfaces 33, 33' formed thereon which are complementary with the convex portions 30, 30', respectively, of roller surfaces 28, 28' on the rocker cam 26. A hardened bearing element 34, 34' is inserted on each rocker cradle surface 33, 33', respectively. A complement of rollers 35, 35' is inserted around roller surfaces 28, 28', respectively. Since the roller surfaces 28, 28' are continuous, the rollers in the complement 35, 35' are free to recirculate. The elements 35, 35' reduce the friction between the rocker cam surfaces 30, 30' and the rollers that is caused by the large pumping forces exerted on the rocker cam 26.

The rollers in the roller complements 35, 35' are prevented from moving laterally from the roller surfaces 28, 28' by a pair of side plates 36, 36'. These side plates 36, 36' are mounted on the sides 29, 29' of rocker cam 26 by bolts 37, 37' which are received in threaded bores 38, 38' in cam 26.

Rocker cam 26 is pivoted with respect to rocker cradle 32 by a piston 39. The attachment of piston 39 to rocker cam 26 and the means for driving the piston 39 may be by any one of many well-known means and are not described in detail since they form no part of the instant invention. It is sufficient to state that as piston 39 is reciprocated, rocker cam 26 is pivoted in rocker cradle 32 from a position of maximum fluid displacement in one direction to a position of maximum fluid displacement in the other direction, with a position of minimum fluid displacement therebetween. As rocker cam 26 is pivoted on rocker cradle 32, the rollers in the roller complements 35, 35' recirculate over the continuous roller surfaces 28, 28' and a portion of the complements, which also engage the bearing surfaces 34, 34' of rocker cradle 32, provide a roller bearing support for rocker cam 26 on rocker cradle 32.

Normally, the pumping forces acting on the pistons 21 tend to bias the rocker cam 26 towards the rocker cradle 32. However, under certain conditions, such as when the delivery pressure from the pump is very low and the inlet pressure to the pump is relatively high, there are hydraulic forces which tend to lift the rocker cam 26 away from the rocker cradle 32. For this reason it is necessary to have a device which retains rocker cam 26 and bearing complements 35, 35' in contact with rocker cradle 32. In the instant invention, a pair of holddown plates 40, 40' are rigidly secured to rocker cradle 32 by bolts 41, 41' which are received in threaded bores 42, 42' in cradle 32. The holddown plates 40, 40' have relatively long sides 43, 43' which overlive and extend beyond the side plates 36, 36'. The sides 43, 43' of the holddown plates 40, 40' terminate in relatively short legs 44, 44' which extend laterally over the rollers lying on the concave, arcuate portions 31, 31' of roller surfaces 28, 28'. In addition, the inner surfaces 45, 45' of the legs 44, 44' are complementary to the arcuate portions 31, 31', respectively, and engage the rollers on the portions 31, 31' to provide a roller bearing support for engagement of rocker cam 26 with holddown plates 40, 40'.

From the above, it can be seen that the instant invention provides a roller bearing support for pivoting rocker cam 26 in rocker cradle 32. Furthermore, it also provides a roller bearing support for the rocker cam 26 on the holddown plates 40, 40' to resist forces tending to lift the cam 26 from the rocker cradle 32.

Although a preferred embodiment of the invention has been illustrated and described, it will be apparent to those skilled in the art that various modifications may be made without departing from the spirit and scope of the present invention.

What is claimed is:

1. A variable displacement fluid energy translating device having a housing, a barrel rotatably supported in the housing, a plurality of cylinders formed in the barrel and aligned parallel with the axis of rotation thereof, a piston mounted for reciprocation in each cylinder, a shoe connected to the end of a piston projecting from each cylinder, a rocker cradle, an arcuate surface formed on the rocker cradle, a rocker cam, means for pivotally supporting the rocker cam on the arcuate surface for movement about an axis perpendicular to the axis of rotation of the barrel, a flat thrust surface on the rocker cam on which the piston shoes slide, means for retaining the shoes against the thrust surface such that the pistons reciprocate within the cylinders when the cam surface is inclined, and means connected to the rocker cam for pivoting the rocker cam within the rocker cradle, characterized by the pivotal support means including a pair of continuous roller surfaces formed one on each side of the rocker cam, each of the roller surfaces having a first convex arcuate portion complementary to and adjcent the arcuate surface formed on the rocker cradle, a second concave arcuate portion parallel to and spaced from the first arcuate portion and a pair of rounded end surfaces which connect each end of the first and second parallel surfaces, a pair of roller complements which engage and circulate on each of the roller surfaces, wherein the rollers in the roller complements which engage the complementary first convex arcuate portion of the roller surfaces simultaneously engage the arcuate surface of the roller cradle to provide a roller bearing support for the rocker cam on the rocker cradle, means for retaining the roller complements in engagement with the roller surfaces, and means for holding the rocker cam and rollers in the roller complements against the rocker cradle, including a holddown plate having an inner surface which is complementary to and adjacent the second concave arcuate portion of the roller surface and engages the roller complement as it circulates between the inner holddown plate surface and the second concave arcuate portion of the roller surface.

* * * * *